Oct. 30, 1945.  G. I. HOLMES  2,387,793

VALVE

Filed Aug. 16, 1940

INVENTOR
Gifford I. Holmes
BY George H. Fisher
ATTORNEY

Patented Oct. 30, 1945

2,387,793

UNITED STATES PATENT OFFICE 2,387,793

VALVE

Gifford I. Holmes, Minneapolis, Minn., assignor to Minneapolis-Honeywell Regulator Company, Minneapolis, Minn., a corporation of Delaware Application August 16, 1940, Serial No. 352,905

13 Claims. (Cl. 236—99)

The present invention relates to valves, and more particularly to valves which will positively close in the event of failure of an actuator therefor, and the method of actuation thereof.

Many modulating valves as at present used comprise several complicated parts. An extremely simple structure for obtaining modulation is a pressure responsive device which moves in accordance with pressure changes caused by a controlled medium. However, such devices applied to fuel valves, radiator valves, or the like, often give rise to an extremely hazardous condition due to mechanical failure of the actuator. For example, if a bellows of the actuator were to burst, or the pressure line become broken, the valve would fail to operate. Failure of operation alone would not be hazardous, but many present valves fail in wide open position. In the case of gas and other fuel valves such failure frequently results in great property damage.

Devices have heretofore been proposed which obviate the above difficulty by providing a double seated opposed valve. Such devices have not met with great favor because the initial cost is quite high due to the accurate machining operations necessary in manufacturing, as well as the fact that the safety valve may fail to operate when needed because gum, or the like, present in most fuels, will become deposited on the valve seat and face. Other devices normally latch out a valve closing means which is brought into action only if the bellows of the actuator collapses. Such devices are satisfactory unless they are subjected to low temperatures during shipment or at other times which will also collapse the bellows and thus cause the closing means to operate, rendering the valve inoperative.

Therefore an object of the present invention is to provide a simplified valve embodying certain novel safety features including an actuator which will actuate the valve in the event of mechanical failure of the condition responsive actuator.

Another object is to provide a valve which will not be rendered permanently inoperative when it is subjected to low temperature.

A further object is to provide a device as set forth in the preceding objects which utilizes a plurality of pressure actuated movable walls to accomplish the desired results.

Another object is to provide a device as set forth in the first two objects which utilizes a changing leverage to accomplish the desired results.

Still other objects will be apparent in the accompanying specification and claims.

Figure 1:
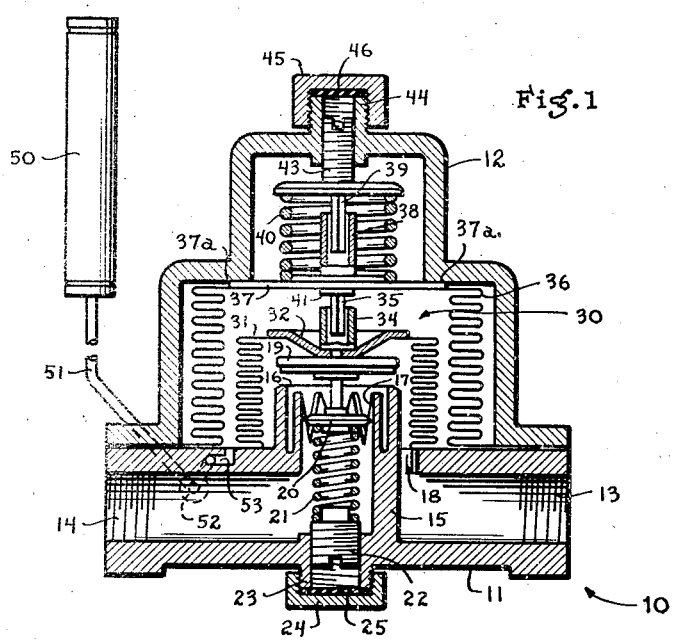
Figure 1 is a vertical sectional view of one modification of my invention.

While the present invention is adapted also to be used as a radiator valve, or a reducing valve, the two modifications shown and to be described are particularly adapted to fuel control. Therefore, although the specification will refer to the device as a gas valve, it will be understood that the term is not used in a limiting sense but only to describe the modifications shown.

A valve 10 has a casing comprising a lower portion 11 and a cover 12. While many adaptations may require an opposite fluid flow, the device shown has in the lower portion 11 an inlet port 13 and an outlet port 14. An upstanding sleeve portion 15 has a valve seating outer sleeve 16 and a V ported inner sleeve 17. A port 18 partially surrounds the sleeve 15 and provides a passageway for the fluid passing through the valve. A valve member 19 cooperates with the valve seat 16 to open and close the valve and a modulating valve disk 20 cooperates with the V ports in the inner valve sleeve 17 to throttle the amount of fluid passing through the valve. A spring 21 normally biases the valve 19 and the valve disk 20 in an upwardly direction. An adjustment screw 22 screws into a boss 23 to provide a tension adjustment for the spring 21. A cap 24 is also screw-threaded onto the boss 23 and presses a sealing washer 25 firmly into engagement with the boss 23 to form a gas tight seal.

Actuating means for the valve are generally indicated by the reference character 30. This actuating mechanism 30 comprises a bellows 31 which is suitably sealed to the lower valve portion 11 and also secured to the valve member 19 by a plate 32. The plate 32 is biased upward by the spring 21 and has a guide sleeve 34 which cooperates with a guide pin 35 to keep the valve in alignment. A second bellows 36 also sealed to the lower valve portion 11, which in the modification shown has about twice the effective area of the bellows 31, is also provided. The bellows 36 has an upper plate forming a movable wall 37 which normally engages the shoulder 37a of the cover 12.

A guiding sleeve 38 secured to the plate 37 cooperates with a guide pin 39 to keep the valve mechanism in alignment in cooperation with the guide pin 35 and the guide sleeve 34 secured to the plate 32. A spring 40 normally biases the movable wall 37 of the bellows 36 in a downwardly direction. As the wall 37 is moved downwardly, a shoulder 41 engages the guide sleeve 34 to force the valve 19 into engagement with the valve seat 16. The spring 40 is so selected that it is able to overcome the tension of the spring 21. An adjustment for the spring 40 comprises a screw 43 which is threaded into a boss 44. A suitable cap seal 45 presses a gasket 46 into engagement with the boss 44.

A pressure responsive device is adapted to actuate the valve. Any suitable pressure responsive device could be utilized such as, for example, the direct pressure from a steam boiler, static pressure in a circulating system or, as in the modification shown a pressure creating temperature responsive bulb 50. The bulb 50 is connected by a pipe 51 to a connection 52 in the lower valve portion 11 and communicates with the space within the valve actuator 30 between the bellows 31 and 36 through a passage 53. Any suitable fluid may be confined within the bulb 50 and the valve actuator 30 which expands and contracts in accordance with temperature changes of the bulb 50.

Operation

The device shown is adapted to modulate the amount of gas supplied to a burner. Assume, for example, that the normal range of modulation as the valve disk 20 moves from the closed lower position to the upper limiting position of the V ports in the inner sleeve 17 is five degrees Fahrenheit and a desired temperature of approximately 70 degrees is to be maintained. Then when the modulating disk 20 is in the lower closed position the temperature to which the bulb 50 is subjected might be approximately 73 degrees and when the modulating disk is in the upper position in relation to the V ports, the value of the temperature would be approximately 68 degrees. It is desirable in valves of the present type to keep the valve disk at approximately the mid position, about as shown in the drawing, at which point the temperature would be maintained at approximately 70 degrees. For such valve position, the valve will be moved in either direction to vary the heat input in accordance with temperature variations at the bulb 50.

The pressure within the bulb 50 which changes in accordance with temperature changes exerts a force upwardly upon the movable wall 37 of the large bellows 36 and downwardly upon the movable wall 32 of the small bellows 31. Because of the fact that the wall 37 presents a large area, the pressure acting thereon will exert a substantial force and be capable of overcoming the tension of the strong spring 40 to force the wall 37 upwardly until it engages the shoulder 37a of the valve cover 12. The pressure exerted upon the bellows 31 will act downwardly upon the sealing plate 32 which forms the wall of the bellows 31. Because the bellows 31 is substantially smaller than the bellows 36 a smaller force will be exerted upon the bellows 31. Assume, for example, that the effective area of the bellows 36 is exactly twice as much as the effective area of the bellows 31. Also assume that the spring 40 exerts a tension of ten pounds and the spring 21 exerts a tension of six pounds. Because the effort exerted by the bellows 36 will be twice as great as that exerted by the bellows 31, the spring 40 will be the first to be compressed and the movable wall 37 will engage the shoulder 37a of the cover 12. After this wall has reached the shoulder the pressure may then rise still higher to cause the bellows 31 to overcome the tension of the spring 21 and modulate the valve in the manner hereinbefore described.

In the event that a leak should occur in either of the bellows 31 or 36, in the pressure exerting bulb 50, in the pressure connecting line 51, or in any of the connections thereof, the valve is adapted to be closed in the following manner. Upon the occurrence of such a leak the pressure within the valve actuator 30 will be dissipated. Because the spring 21 exerts a greater relative force upon the bellows 31 than the spring 40 exerts upon the bellows 36, the valve 19 will first be urged to wide open position. However, upon further dissipation of pressure, the strong spring 40 which is now not opposed by pressure exerted upon the movable wall 37 will overcome the relatively lighter spring 21 and thus positively force the valve 19 into engagement with its seat 16 to thereby close the valve. It will be understood that in most instances where a leak occurs such as the bellows bursting this action will be quite rapid. If the leak is relatively small the same ultimate result will obtain, and even though the action is slower the continuance of a hazardous condition such as the valve remaining in wide open position after failure in the actuator occurs will be prevented. Thus, upon a failure in the actuator, the valve is moved from its open position with respect to the valve seat, which position is an active position in that fluid can flow through the valve, to its closed position, which latter position is a safe position in that a flow of fluid through the valve is prevented.

While I have described the device shown in Figure 1 as having adjustable springs biasing the different bellows 31 and 36, there will be many adaptations for the device wherein there will not be a need for having adjustable tensioned bellows. The prime reason for having adjustable bellows is so that an extremely accurate control may be obtained and factory adjustments may be made as well as adjustments for particular installations. However, there are a great number of installations wherein each device works as every other device of the particular kind. For such installations the adjustable springs may be dispensed with in the following manner. If the bellows 36 is properly selected of a heavy material which exerts a relatively great spring effort and the bellows is normally in a collapsed state, and the smaller bellows 31 is made of relatively light material and is normally expanded, the device will operate in the same manner as the device described in Figure 1 except that the adjustment springs would be eliminated. In other words, the smaller bellows 31, in the assembled valve, would tend to maintain the valve member in an open position and the stronger and larger bellows 36 would tend to maintain the valve member 19 in closed position. However, if pressure were exerted upon the larger bellows this bellows would be the first to move away because of the larger effective area and the smaller bellows 31 would then be free to modulate the valve. In the event of rupture of either of the bellows 31 and 36, or the actuating connections therefor, the then stronger bellows 36 would compress the weaker bellows 31 to positively close the valve. Hence it is seen that for any standardized type of valve desired, bellows having suitable spring tensions and effective areas may be selected to thereby obviate the need of adjustment springs.

It will be understood that diaphragms, or other mechanical equivalents, could also be used without departing from the spirit of the present invention.

Figure 2:
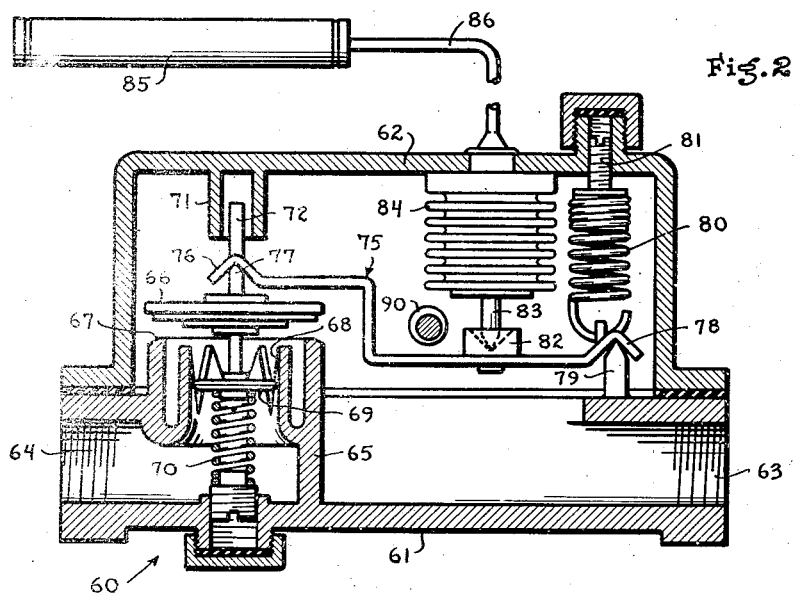
Figure 2 is a similar sectional view of another modification.

The device shown in Figure 2

Referring now to Figure 2, the valve 60 has a lower portion 61 and a cover portion 62. The lower portion 61 has an inlet port 63, an outlet port 64 and a sleeve 65 which is similar in all respects to the sleeve 15 described in Figure 1. A valve 66 cooperates with a valve seat 67 in the sleeve 65 and a V ported modulating sleeve 68 cooperates with a valve disk 69. An adjustment spring 70 is provided to bias the valve 66 upwardly. A guiding sleeve 71 cooperates with a valve stem 72 to stabilize the valve and prevent excess lateral movement thereof. It will be noted that the sleeve 71 has a large bore which allows for very free movement of the stem 72.

A lever generally indicated by the reference character 75 has a valve actuating end 76 which engages a knife edge 77 carried by the valve stem 72. The valve actuating lever 75 has a second fulcrum end 78 which normally engages a knife edge 79 carried by the lower portion 61 of the valve. The fulcrum end 78 of the lever 75 is connected to and biased upwardly by a relatively strong spring 80. The spring 80 is adjustably secured to the cover by means of a screw 81 in the same manner as the adjustment screws referred to in Figure 1. The valve actuating lever 75 has a cratered abutment member 82 into which an actuating stem 83 of a pressure responsive bellows 84 fits. The bellows 84 is suitably secured to the cover 62 and is actuated in response to pressure changes produced as a result of the effect of temperature changes upon a thermostatic bulb 85. The bulb 85 is connected to the bellows 84 by a pressure pipe 86.

Operation

The spring 80 may be approximately twice as strong as the spring 70 because the leverage about the cratered member 82 and the knife edges 79 and 77 is so selected that the effective effort exerted by the spring 70 upon the valve actuating lever 75 is greater than the effective effort exerted thereon by the valve closing spring 80. By such arrangement, upon an increase in pressure in the bellows 84, the end 78 of the lever 75 will engage the knife edge 79 before the end 76 will be moved because of the mechanical advantage of leverage as set out above. After the end 78 has engaged the knife edge 79, the lever 75 will be actuated as a lever of the third class and the end 76 will then move the valve members 66 and 69 to cause the valve to be modulated in accordance with the changes in pressure exerted by the pressure responsive device 85.

If the bellows 84 should burst or a leak should occur in the bulb 85, the pressure pipe 86 or any of the connections therefor, the actuating stem 83 will be moved upwardly. Because the spring 70 exerts a greater effective effort on the lever 75 than does the spring 80, the valve 66 would first be opened wide. However, upon the bellows 84 being deflated still further, the lever 75 will engage an abutting pivot 90 which is adjustably secured to the cover 62. After this engagement the spring 80 will then be capable of overcoming the tension of the spring 70 because the effective lever arm through which spring 80 acts upon the valve 66 would be changed. It will be noted in the drawing that the engagement of the pivot 90 with the lever 75 almost equalizes the effective leverage of the springs 70 and 80. Therefore because the spring 80 is about twice the strength of the spring 70 the valve 66 will be positively closed by the tension of the spring 80. The lever 75 will act as a lever of the first class and pivot about the fulcrum 90 to obtain this closure of the valve.

It is seen that the action of the device shown in Figure 2 is substantially identical to the action of the device shown in Figure 1. It will also be noted that in both of the modifications shown and described the valve is not rendered completely inoperative due to a safety operation. That is, if the devices are closed due to low temperatures, they will resume normal function when the temperature again rises without the necessity of manually resetting the actuator. This is a desirable feature in that the devices may be shipped, or left idle, during cold winter weather without necessitating skilled attention before they will operate as desired.

While I have described my device in connection with a gas valve, it will be clearly understood that the present device is readily adaptable to use as a steam valve, a reducing valve or many other modifications thereof. Therefore, it should be clearly understood that I am not to be limited in my invention only to those forms shown and described but rather by the scope of the appended claims.

I claim as my invention:

1. A valve mechanism comprising, a valve casing, a modulating valve member operable between a closed position and a modulating open position, a first spring biasing said valve open, a first bellows having a predetermined effective area, a condition responsive device responsive to the variations in a variable condition for exerting a variable force upon said bellows against the bias of said first spring to thereby modulate said valve, a second bellows having a predetermined larger effective area than said first bellows, said second bellows also being acted upon by said condition responsive device, and a second spring, stronger than said first spring, exerting a force in a direction to close said valve when said second bellows is collapsed, said stronger second spring being held in an inactive position by said second bellows for normal operating conditions for said valve.

2. In a valve, in combination, a valve casing, a valve seat therein, a valve cooperable with said valve seat; a valve actuator comprising a first bellows, a relatively larger second bellows, both of said bellows being pressure responsive, and a temperature responsive volatile fluid thermostat for generating pressure to actuate said two bellows, said first bellows being urged in one direction by the pressure to normally actuate said valve, and said second bellows being urged in the opposite direction so that normally it will not actuate said valve, and a one way connection between said two bellows for causing said second bellows to urge said valve to closed position when the pressure falls to a predetermined low value.

3. In a valve, in combination, a valve casing, a valve seat therein, a valve cooperable with said valve seat; a pressure actuated bellows, a temperature responsive volatile fluid thermostat for generating pressure to actuate said bellows, a lever operatively connecting said bellows to said valve, a first spring acting upon said bellows through said lever, a relatively stronger second spring acting upon said bellows through a normally relatively shorter leverage than said first spring, and a pivot for changing the leverage relationship of said two springs to said lever when the pressure within said bellows falls to a predetermined low value.

4. In a valve comprising a valve seat and a valve member for moving to and from said seat to close and open said valve, the combination of, temperature responsive pressure generating means, pressure responsive valve actuating means including two movable valve actuating portions, said valve actuating means being responsive to pressure changes caused by temperature variations affecting said generating means for moving said portions, the first of said portions being adapted to receive a larger portion of the force due to pressure generated by said generating means than the second of said portions, a relatively strong first spring biasing the first of said portions to close said valve, a relatively weak second spring biasing the second of said portions to open said valve, an abutment means against which said first portion is moved upon an initial rise in temperature at said pressure generating means, and a valve stem connected to said second portion for movement thereby upon further temperature rise at said pressure generating means for normally actuating said valve, said first spring being adapted, upon failure of said actuating means, to overcome said second spring to move said first and second portions to close said valve.

5. A valve comprising in combination, a valve seat, a valve member movable to and from said seat to valve a fluid, an expansible pressure motor means, temperature responsive means for varying the pressure acting on said motor to expand the same, a first relatively strong spring acting on said motor means to oppose expansion thereof, a second relatively weak spring acting on said motor means to oppose expansion thereof, and means, including said motor means, associated with said valve member and having first and second portions, said first portion being connected to said first spring, said second portion being connected to said second spring, and a stop associated with said first portion, said motor means moving said first portion against said stop and thereafter moving said second portion to move said valve when the pressure acting on said motor means is within predetermined limits, and causing said first portion to be moved by said first spring away from said stop to cause closure of said valve when said pressure decreases below a predetermined low limit.

6. In a valve, in combination, a valve casing, a valve seat therein, a valve cooperable with said seat; a valve actuator comprising a pressure responsive bellows means, a first portion of said bellows means of a first area, a second portion of said bellows means of a second larger area, yieldable means acting on said second portion, and pressure generating means for actuating said bellows, said first portion being urged in a first direction by the pressure to normally actuate said valve, and said second portion being urged in the opposite direction against said yieldable means so that normally it will not actuate said valve, and connecting means between said two portions for causing said yieldable means acting on said second portion to urge said valve to closed position when the pressure falls to a predetermined low value.

7. In a valve, in combination, a valve casing, a valve seat therein, a valve cooperable with said seat; a valve actuator comprising a pressure responsive bellows means for exerting force, first yieldable means acting on a first portion and opposing a part of said force, second yieldable means acting on a second portion and opposing a larger part of said force, and pressure generating means for actuating said bellows means, said first portion being urged in a first direction against said first yieldable means by the pressure to normally actuate said valve, and said second portion being urged in the opposite direction by said second yieldable means so that normally it will not actuate said valve, and connecting means between said two portions for causing said yieldable means acting on said second portion to urge said valve to closed position when the pressure falls to a predetermined low value.

8. In a valve, in combination, a valve casing, a valve seat therein, a valve cooperable with said seat; a valve actuator comprising a pressure responsive bellows means for exerting force, first yieldable means acting on a first portion and opposing a part of said force, second yieldable means acting on a second portion and opposing a larger part of said force, and pressure generating means for actuating said bellows means, said first portion being urged against said first yieldable means by the pressure to normally actuate said valve, and said second portion being urged by the pressure against said second yieldable means to a position in which normally it will not actuate said valve, and connecting means between said two portions for causing said yieldable means acting on said second portion to urge said valve to closed position when the pressure falls to a predetermined low value.

9. A valve device comprising, in combination, a valve casing, a valve seat therein, a valve cooperable with said seat and biased to one position with respect to said seat, an expansible pressure motor means connected to said valve and effective upon expansion thereof to move said valve against its bias towards a second position, a yieldable force exerting means, connecting means associated with said valve and said force exerting means and operative when said force exerting means is otherwise unrestrained to move said valve towards said second position, a stop, and means whereby said expansible motor means holds said force exerting means immovably against said stop as long as the pressure within said motor means is above a predetermined value so that said force exerting means normally has no effect upon the position of the valve.

10. A valve device comprising, in combination, a valve casing, a valve seat therein, a valve cooperable with said seat and biased to one position with respect to said seat, an expansible pressure motor means connected to said valve and effective upon expansion thereof to move said valve against its bias towards a second position, spring means, connecting means associated with said valve and said spring means and operative when said spring means is otherwise unrestrained to move said valve towards said second position, a stop, and means whereby said expansible motor means holds said spring means immovably against said stop in a constantly stressed condition as long as the pressure within said motor means is above a predetermined value so that said spring means normally has no effect upon the position of the valve.

11. A control device comprising, in combination, a control element biased to one position, an expansible pressure motor means connected to said control element and effective upon expansion thereof to move said element against its bias towards a second position, spring means, connecting means associated with said element and said spring means and operative when said spring means is otherwise unrestrained to move said element towards said second position, a stop, and means whereby said expansible motor means holds said spring means against said stop in a constantly stressed condition as long as the pressure within said motor means is above a predetermined value so that said spring means normally has no effect upon the position of said element.

12. A control device comprising control elements relatively movable between a first position and a second position and biased to said first position, yieldable force exerting means tending to relatively move said elements to said second position, a stop adjacent said yieldable force exerting means, a thermally expansible means so connected to one of said elements as to normally control the relative positions of said control elements by variably opposing said bias, and means connecting said thermally expansible means to said yieldable force exerting means in such a manner that said thermally expansible means is effective through its normal range of movement to hold said yieldable force exerting means against said stop so that said yieldable force exerting means has substantially no effect upon the relative position of said elements.

13. A valve mechanism comprising, a valve casing, a valve operable between two extreme positions, a first force exerting means, a second force exerting means, said first and said second force exerting means being disposed to exert forces in opposing directions on said valve, pressure responsive means arranged to oppose said first and said second force exerting means, said pressure responsive means being disposed under normal operating pressure to overpower said first force exerting means and maintain said means inactive and to position said valve in accordance with the value of the normal operating pressure as opposed to the value of said second force exerting means, and said first force exerting means being disposed to overpower said pressure responsive means and said second force exerting means when pressure within said pressure responsive means is below said normal operating value.

GIFFORD I. HOLMES.